US009253348B2

(12) United States Patent
Tanaka (10) Patent No.: US 9,253,348 B2
(45) Date of Patent: Feb. 2, 2016

(54) DISPLAY CONTROL DEVICE AND ELECTRONIC APPARATUS

(71) Applicant: KYOCERA Document Solutions Inc., Osaka-shi, Osaka (JP)

(72) Inventor: Yoko Tanaka, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 14/524,005

(22) Filed: Oct. 27, 2014

(65) Prior Publication Data

US 2015/0116770 A1   Apr. 30, 2015

(30) Foreign Application Priority Data

Oct. 31, 2013  (JP) ................................. 2013-226495

(51) Int. Cl.
| | |
|---|---|
| G06F 3/12 | (2006.01) |
| H04N 1/00 | (2006.01) |
| G06F 3/041 | (2006.01) |
| G06F 3/01 | (2006.01) |
| G06F 3/0482 | (2013.01) |
| G06F 3/0488 | (2013.01) |
| G06F 3/0484 | (2013.01) |

(52) U.S. Cl.
CPC .............. *H04N 1/0048* (2013.01); *G06F 3/016* (2013.01); *G06F 3/0416* (2013.01); *G06F 3/0482* (2013.01); *G06F 3/04847* (2013.01); *G06F 3/04883* (2013.01); *G06F 3/04886* (2013.01); *H04N 1/00392* (2013.01); *H04N 1/00474* (2013.01); *H04N 1/00488* (2013.01); *H04N 2201/0094* (2013.01)

(58) Field of Classification Search
CPC ..... G06F 3/016; G06F 3/0416; G06F 3/0488; G06F 3/04886; G06F 17/276; G06F 2203/0381; G06F 3/03547; G06F 3/0482; G06F 3/04847; G06F 3/04883; G01C 21/3652; G06N 99/005; G06G 2654/00; H04R 2400/03; H04R 2499/11; H04N 1/00392; H04N 1/00474; H04N 1/00488; H04N 1/0048
USPC .......................... 358/1.1, 1.15; 345/156, 184
See application file for complete search history.

(56) References Cited

U.S. PATENT DOCUMENTS

| | | | |
|---|---|---|---|
| 2006/0109256 A1 | 5/2006 | Grant et al. | |
| 2006/0181520 A1 | 8/2006 | Ikegawa | |
| 2009/0322695 A1 | 12/2009 | Cho et al. | |
| 2010/0238116 A1* | 9/2010 | Shin | ............................. 345/168 |

FOREIGN PATENT DOCUMENTS

| | | |
|---|---|---|
| EP | 2192474 A2 | 6/2010 |
| JP | 2006018582 A | 1/2006 |
| JP | 2008065518 A | 3/2008 |
| JP | 2008276278 A | 11/2008 |
| JP | 2013097519 A | 5/2013 |

OTHER PUBLICATIONS

Office Action issued in the corresponding Japanese Patent Application No. 2013-226495 dated Nov. 4, 2015.

* cited by examiner

*Primary Examiner* — Iriana Cruz (57) ABSTRACT

A display control device includes a display unit that displays one or a plurality of instruction images to be pressed to input operating instructions, a key press detection unit that detects a press on the instruction image, a key press duration detection unit that detects a duration of the time the key press detection unit continuously detects that the instruction image is being pressed, and a vibration drive unit that starts applying vibration to the display unit in response to a press on the instruction image detected by the key press detection unit and adjusts the amplitude of the vibration based on the type of the instruction image detected as being pressed and the key press duration.

10 Claims, 7 Drawing Sheets

| SOFTWARE KEY | CUMULATIVE NUMBER OF PRESSES |
|---|---|
| T1 | 10 |
| T2 | 5 |
| T3 | 1 |
| T4 | 10 |
| T5 | 1 |
| T6 | 10 |
| T7 | 5 |

FIG.7

| CUMULATIVE NUMBER C | UPDATE DEGREE U |
|---|---|
| 5>C | 1 |
| 10>C≧5 | 1.2 |
| C≧10 | 1.5 |

DISPLAY CONTROL DEVICE AND ELECTRONIC APPARATUS

INCORPORATION BY REFERENCE

The disclosure of Japanese Patent Application No. 2013-226495 filed on Oct. 31, 2013 including the specification, drawings and abstract is incorporated herein by reference in its entirety.

BACKGROUND

The present disclosure relates to a display control device and an electronic apparatus provided with the display control device, and more particularly to a technique to make users recognize the operation details.

Electronic apparatuses with touch panels have been known conventionally. One of these known electronic apparatuses is, for example, an operation display device with a touch panel mounted on a liquid crystal display (LCD). This operation display device includes a driving member that applies vibration to the touch panel and a buzzer that makes a buzzing sound. If an operator touches an area where touch operation (selecting operation) is inhibited on the operation screen (unselectable area), as is well known, the driving member imparts vibration to the touch panel as well as the buzzer starts buzzing.

SUMMARY

A display control device according to an aspect of the present disclosure includes a display unit, a key press detection unit, a key press duration detection unit, and a vibration drive unit. The display unit displays one or a plurality of instruction images to be pressed to input operating instructions. The key press detection unit detects a press on the instruction image. The key press duration detection unit detects a duration of the time the key press detection unit continuously detects that the instruction image is being pressed. The vibration drive unit starts applying vibration to the display unit in response to a press on the instruction image detected by the key press detection unit and adjusts the amplitude of the vibration based on the type of the instruction image detected as being pressed and the key press duration.

An electronic apparatus according to another aspect of the present disclosure includes the display control device and an instruction acceptance unit that accepts an operating instruction corresponding to an instruction image when the key press detection unit detects a press on the instruction image.

DETAILED DESCRIPTION

First Embodiment

Figure 1:
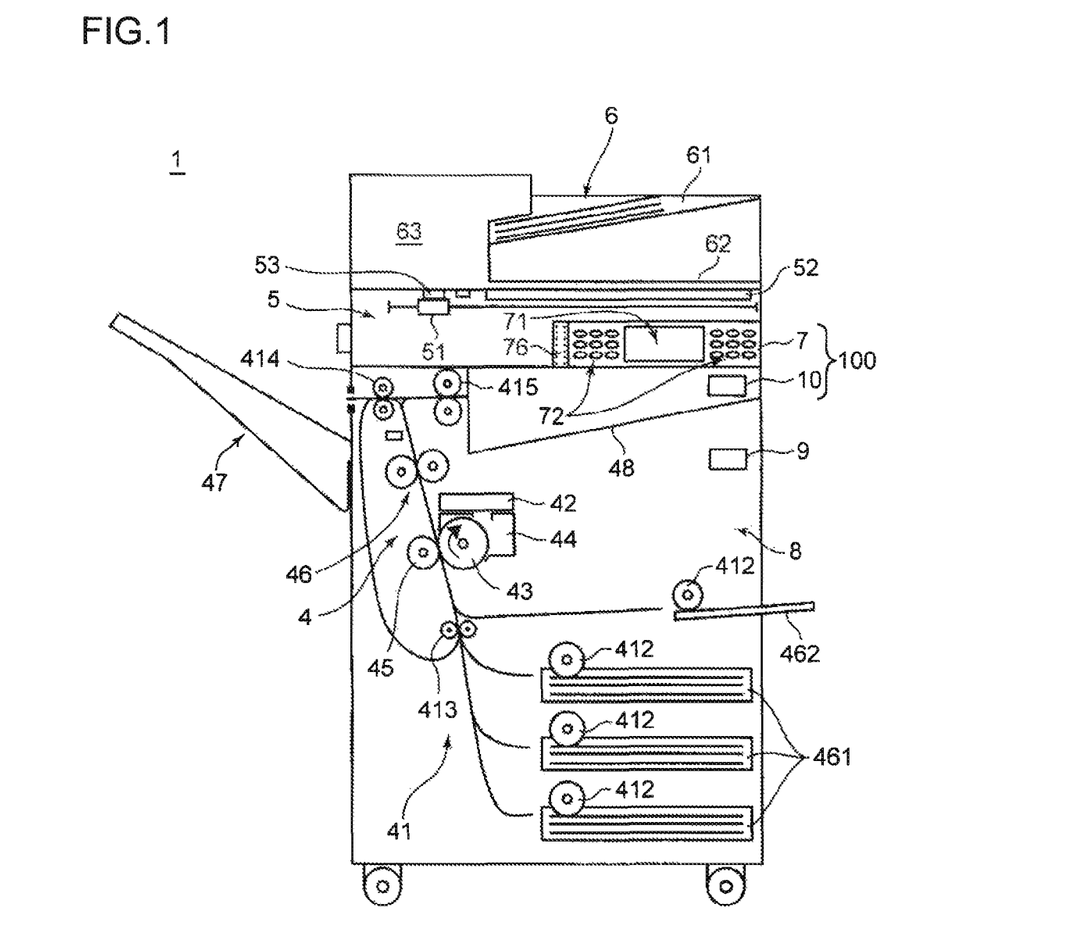
FIG. 1 is a schematic configuration diagram of a multifunction peripheral, which is an example of the electronic apparatus according to the present disclosure.

An embodiment of the electronic apparatus according to the present disclosure will be described below with reference to the accompanying drawings. FIG. 1 is a schematic configuration diagram of a multifunction peripheral 1, which is an example of the electronic apparatus according to the present disclosure. As shown in FIG. 1, the multifunction peripheral 1 includes a document reading unit 5, a document feeding unit 6, a main body 8, and an operation unit 7.

The document reading unit 5 is disposed at an upper part of the main body 8. The document reading unit 5 includes a scanner 51 having an exposure lamp, a charge coupled device (CCD) and other components, a document platen 52 composed of a transparent material, such as glass, and a document reading slit 53.

The scanner 51 is configured to move by means of a driving unit (not shown). When reading a document placed on the document platen 52, the scanner 51 is moved along the document surface while facing the document platen 52. Then, the scanner 51 outputs the image data acquired, while scanning the document image, to a control unit 10 which will be described later. When reading a document fed by the document feeding unit 6, the scanner 51 is moved so as to face the document reading slit 53, acquires the document image in synchronization with the document feeding operation by the document feeding unit 6 through the document reading slit 53, and outputs the image data to the control unit 10 to be described later.

The document feeding unit 6 is disposed over the document reading unit 5. The document feeding unit 6 includes a document placement portion 61 on which documents are placed, a document ejection portion 62 used to eject the documents whose images have been read, and a document transport mechanism 63 that picks up the documents placed on the document placement portion 61 one by one, transports the documents to a position facing the document reading slit 53, and ejects the documents to the document ejection portion 62.

The main body 8 includes a plurality of paper supply cassettes 461, paper feeding rollers 412 that pick up paper sheets one by one from the paper supply cassettes 461 or a manual paper supply tray 462 to feed the paper sheets to an image forming unit 4, the image forming unit 4 that forms images on the paper sheets taken out from the cassettes or tray, and a stack tray 47 and an ejection tray 48 to which the paper sheets with images formed thereon are ejected. The main body 8 further includes a communication unit 9 and a control unit 10.

The image forming unit 4 includes a paper transport unit 41, an optical scanning device 42, a photoconductive drum 43, a developing unit 44, a transfer unit 45, and a fixing unit 46.

The paper transport unit 41 includes a conveyance roller 413 that is set in a paper transport path within the image forming unit 4 and supplies the paper fed by the paper feeding rollers 412 to the photoconductive drum 43, a conveyance roller 414 that delivers the paper to the stack tray 47, and a conveyance roller 415 that delivers the paper to the ejection tray 48.

The optical scanning device 42 outputs laser light based on image data input in the control unit 10. The optical scanning device 42 scans the photoconductive drum 43 with the laser light to form an electrostatic latent image on the photoconductive drum 43.

The developing unit 44 applies toner to the electrostatic latent image on the photoconductive drum 43 to form a toner image. The transfer unit 45 transfers the toner image on the photoconductive drum 43 to a sheet of paper. The fixing unit 46 applies heat to the sheet with the toner image transferred thereon to fix the toner image on the sheet.

The operation unit 7 includes a display device 71 that displays various types of information, an operation key section 72 that is used by users to input various operating instructions, and a speaker 76 that outputs sound.

The communication unit 9 is connected to a network, such as a local area network (LAN), or a telephone line to communicate with external devices, such as personal computers and fax machines. For example, the communication unit 9 transmits image data read by the document reading unit 5 to other fax machines and receives image data transmitted from other fax machines through the telephone line. Alternatively, the communication unit 9 transmits image data read by the document reading unit 5 to other external devices and receives image data transmitted from other external devices through the network.

The control unit 10 is connected to the document reading unit 5, document feeding unit 6, image forming unit 4, operation unit 7, and communication unit 9 to control their operations. The control unit 10 and operation unit 7 compose a display control device 100 according to an embodiment of the display control device of the present disclosure.

The control unit 10 includes, for example, a central processing unit (CPU), a read only memory (ROM) that stores various programs to be executed by the CPU, data necessary for the execution, images and other types of data to be displayed on an LCD 74 in advance, a random access memory (RAM) serving as a so-called working memory of the CPU, a timer circuit for measuring time, and peripheral circuits of these components.

Figure 2:
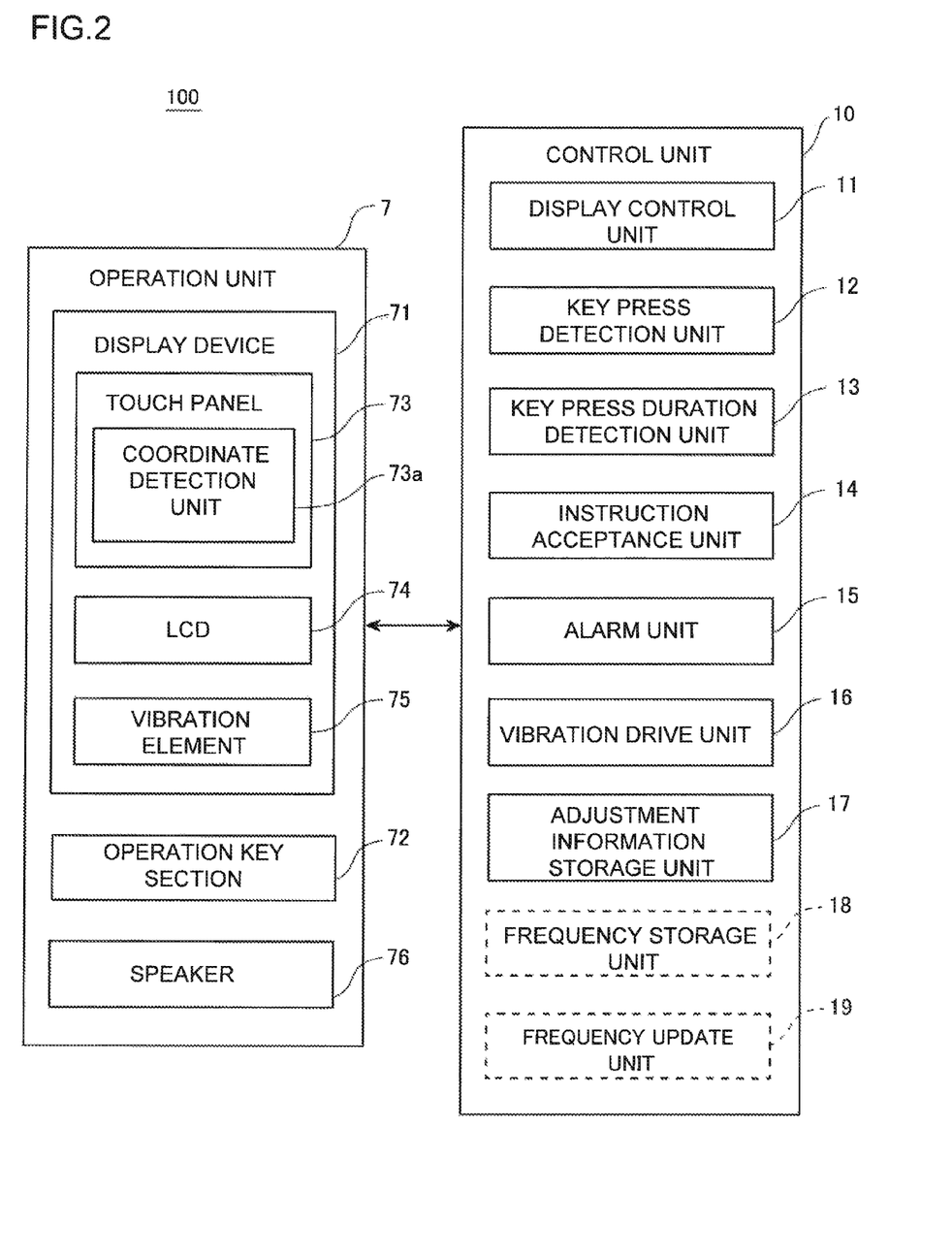
FIG. 2 is a block diagram showing the electrical configuration of a display control device according to an embodiment of the display control device of the present disclosure.
Figure 3A:
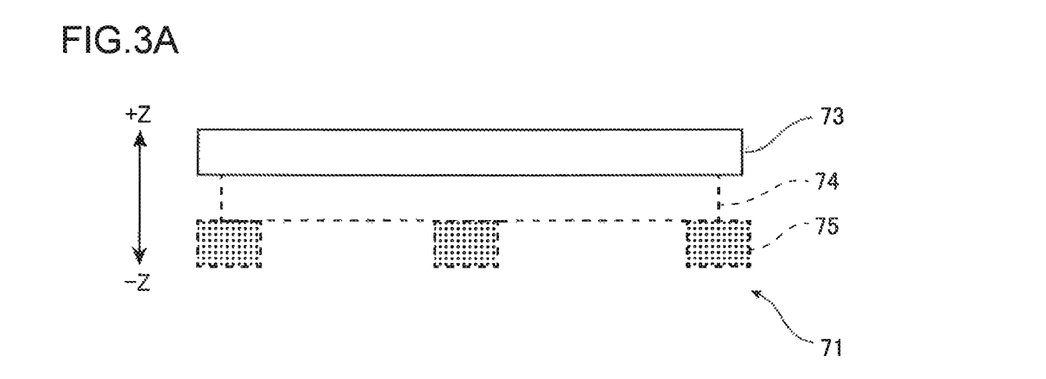
FIG. 3A is a schematic cross-sectional view of a display device.
Figure 3B:
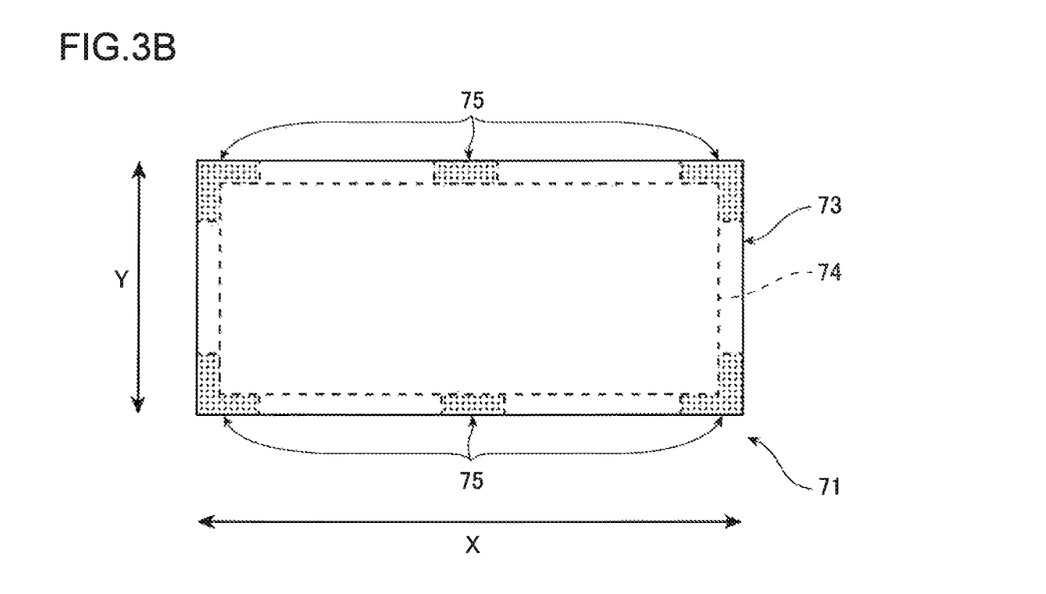
FIG. 3B is an external view of the display device viewed from above.

Detailed description will be now given about the display control device 100. FIG. 2 is a block diagram showing the electrical configuration of the display control device 100 according to an embodiment of the display control device of the present disclosure. FIG. 3A is a schematic cross-sectional view of the display device 71, and FIG. 3B is an external view of the display device 71 viewed from above (in the +Z direction in FIG. 3A).

As shown in FIG. 2, the operation unit 7 includes the display device 71, operation key section 72, and speaker 76 as described above. The display device 71 includes a touch panel 73, a liquid crystal display (hereinafter, referred to as LCD) 74 (display unit), and vibration elements 75, those being stacked in this order from above (in the +Z direction in FIG. 3A) as shown in FIG. 3A.

The touch panel 73 includes, for example, a capacitance type sensor. The sensor provided to the touch panel 73 is not limited to the capacitance type sensor, but can be, for example, a resistive type sensor. The touch panel 73 functions as a coordinate detection unit 73a with the use of the sensor. When a user touches a surface of the touch panel 73, the coordinate detection unit 73a detects a position where capacitance change occurs by using the sensor. Then, the coordinate detection unit 73a outputs a detection signal indicating the detected position expressed by two-dimensional coordinates in X-direction and Y-direction as shown in FIG. 3B, to the control unit 10.

The LCD 74 includes a liquid crystal panel and a backlight (not shown). The liquid crystal panel contains a plurality of liquid crystals that are aligned in a predetermined direction on a pixel by pixel basis. The backlight includes, for example, a light emitting diode (LED) disposed on the lower side of the liquid crystal panel (in the −Z direction in FIG. 3A).

Each liquid crystal of the liquid crystal panel is applied with an electric field under control of a display control unit 11, which will be described later. The backlight illuminates the entire surface of the liquid crystal panel from below the liquid crystal panel under control of the display control unit 11 to be described later. In short, the respective liquid crystals allow the illumination light from the backlight to pass therethrough or block the illumination light, thereby displaying an image composed of pixels associated with the liquid crystals on the front surface of the liquid crystal panel.

The vibration elements 75 are, for example, piezoelectric elements. The vibration elements 75 are disposed at six positions on the lower side of the LCD 74 (in the −Z direction in FIG. 3A) as shown in FIG. 3B, specifically, at four corners of the LCD 74 and at the center of respective upper and lower sides of the LCD 74. Upon receiving an electrical signal (current, voltage) from a vibration drive unit 16, which will be described later, the vibration elements 75 vibrate upward and downward (in the Z direction in FIG. 3A) with an amplitude corresponding to the signal level of the electrical signal to apply the vibration to the LCD 74.

The operation key section 72 is composed of various hardware keys that allow users to input various operating instructions. For example, the operation key section 72 includes hardware keys, such as a start key enabling users to input instructions to start executing various functions and numeral keys to input numbers, symbols and so on.

Upon receiving an electrical signal (current, voltage) from an alarm unit 15, which will be described later, the speaker 76 outputs a predetermined alarm sound, such as a beep tone, at a volume corresponding to the signal level of the electrical signal.

In order to control the operation of the operation unit 7, the control unit 10 mainly functions as a display control unit 11, a key press detection unit 12, a key press duration detection unit 13, an instruction acceptance unit 14, an alarm unit 15, a vibration drive unit 16, and an adjustment information storage unit 17 as enclosed by a solid line in FIG. 2.

The display control unit 11 displays images representing various types of information on the LCD 74. Specifically, the display control unit 11 retrieves an image of information to be displayed on the LCD 74 from the ROM or other storage units. The display control unit 11 adjusts the electrical signal (current or voltage) to be supplied to the liquid crystal panel to adjust the amplitude of the electric field to be applied to the respective liquid crystals associated with pixels for the retrieved image. Then, the display control unit 11 supplies an electrical signal (current or voltage) of a predetermined level to the backlight to cause the backlight to illuminate the entire surface of the liquid crystal panel at a predetermined brightness. Thus, the image representing the information to be displayed is displayed on the LCD 74.

For example, the display control unit 11 displays on the LCD 74 an image of an operation screen W1 or W2 in which one or more software keys (instruction images) to be pressed to input operating instructions are laid out.

Figure 4A:
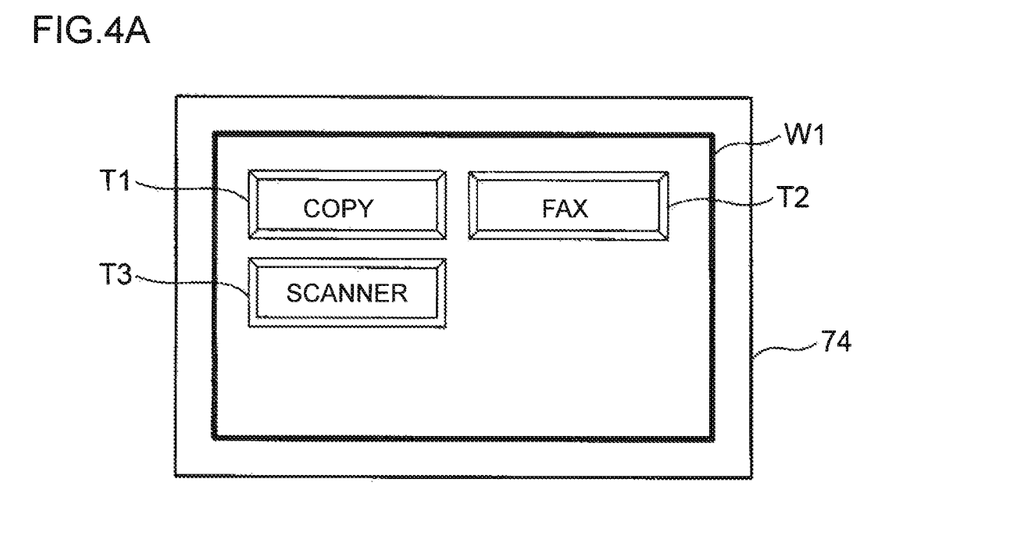
FIG. 4A is an explanatory diagram showing an example of an operation screen that is used to select and operate functions of the multifunction peripheral.

FIG. 4A is an explanatory diagram showing an example of an operation screen W1 that is used to select and operate functions of the multifunction peripheral 1. As shown in FIG. 4A, arranged on the operation screen W1 are, for example, a software key T1 that is used to input instructions to change settings of the copy function, a software key T2 that is used to input instructions to change settings of the facsimile transmission function, and a software key T3 that is used to input instructions to change settings of the scanner function.

For the sake of reference, the copy function is to read an image of a document through the document reading unit 5 and/or document feeding unit 6 to form the read image on a sheet of paper by means of the image forming unit 4. The facsimile transmission function is to read an image of a document through the document reading unit 5 and/or document feeding unit 6 to transmit the read image to external fax machines by means of the communication unit 9. The scanner function is to read an image of a document through the document reading unit 5 and/or document feeding unit 6 to store the read image in the RAM or other storage units or to transmit the read image to external devices, such as a personal computer, by means of the communication unit 9.

Figure 4B:
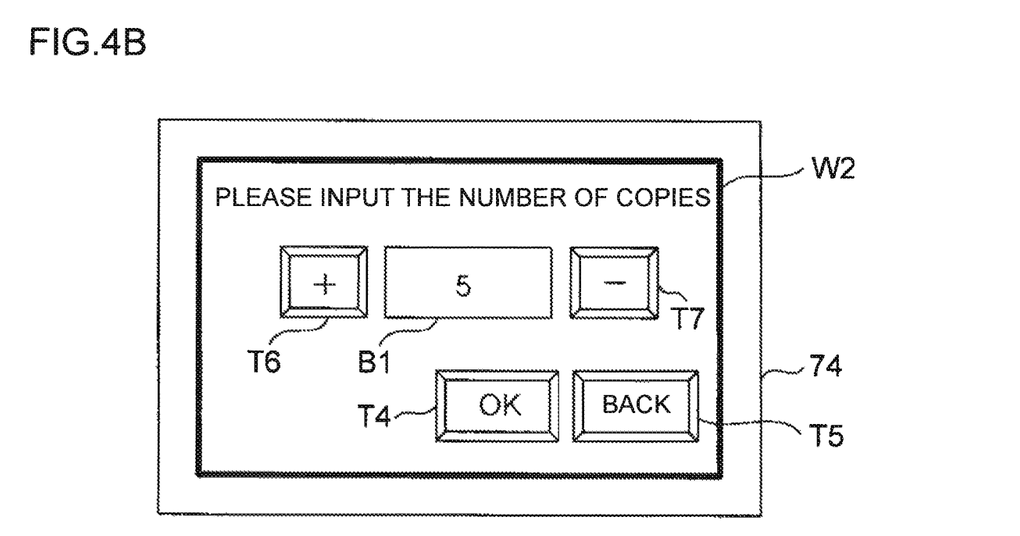
FIG. 4B is an explanatory diagram showing an example of an operation screen that is used to input the number of copies.

FIG. 4B is an explanatory diagram showing an example of an operation screen W2 that is used to input the number of copies. As shown in FIG. 4B, arranged on the operation screen W2 are, for example, a text box B1 that shows the number of copies and also allows users to input a numeric value of the copy number by means of the numeric keys (not shown) of the operation key section 72 or software keys T6, T7, which will be described later.

The software keys T6, T7 are arranged on the operation screen W2. The software key T6 is pressed to provide an instruction for increasing the input value of the number of copies displayed in the text box B1 in accordance with the duration of time the software key T6 is pressed and held down. On the other hand, the software key T7 is pressed to provide an instruction for decreasing the input value of the number of copies displayed in the text box B1 in accordance with the duration of time the software key T7 is pressed and held down.

In addition, there are arranged on the operation screen W2, a software key T4 that is pressed to provide an instruction for confirming the input value displayed in the text box B1 as the number of copies and a software key T5 that is pressed to provide an instruction for changing the operation screen W2 to the previous operation screen.

The key press detection unit 12 detects that a software key on an operation screen has been pressed (touch screen operation) based on the position coordinates indicated by a detection signal output from the coordinate detection unit 73a. Given that a user presses the software key T1 while the display control unit 11 displays the operation screen W1 (FIG. 4A) on the LCD 74. In this case, the coordinate detection unit 73a (FIG. 2) outputs a detection signal indicating a coordinate position within a region where the software key T1 is displayed. At this moment, the key press detection unit 12 retrieves an image representing the operation screen W1 from the ROM or other storage units and detects that the software key T1 has been pressed when determining that the coordinate position indicated by the detection signal corresponds to the pixels representing the software key T1.

The key press duration detection unit 13 detects the key press duration, which is a duration time the key press detection unit 12 continuously detects that the software key is being pressed, and outputs a detection signal indicating the key press duration. Specifically, once the key press detection unit 12 detects that a software key is pressed, the key press duration detection unit 13 starts measuring the time elapsed from when the press is detected using a timer circuit. While the key press detection unit 12 continuously detects that the software key is being pressed, the key press duration detection unit 13 outputs the measured time as a key press duration in the form of a detection signal indicating the key press duration. The key press duration detection unit 13 stops measuring the elapsed time when the key press detection unit 12 fails to detect that the software key is pressed, and then terminates output of detection signals.

When the key press detection unit 12 detects that a software key is pressed, the instruction acceptance unit 14 accepts an operating instruction associated with the software key.

Suppose the key press detection unit 12 detects that the software key T1 is pressed while the display control unit 11 displays the operation screen W1 (FIG. 4A) on the LCD 74. In this case, the instruction acceptance unit 14 accepts an instruction for changing settings of the copy function represented by the software key T1. Upon accepting the instruction for changing the settings of the copy function, the instruction acceptance unit 14 causes the display control unit 11 to display an operation screen to be used to change the settings of the copy function.

Suppose the key press detection unit 12 detects that the software key T6 is pressed while the display control unit 11 displays the operation screen W2 (FIG. 4B) on the LCD 74. In this case, the instruction acceptance unit 14 accepts an instruction for increasing the input value of the number of copies displayed in the text box B1 in accordance with the duration of the time that the software key T6 is pressed. Upon receiving the instruction, the instruction acceptance unit 14 increments the input value of the copy number displayed in the text box B1, for example, by one per second while the software key T6 is being pressed, and then causes the display control unit 11 to display an image of the incremented input value. In short, the text box B1 shows an image of an input value incremented by one every one second after a user presses the software key T6. The images of the numbers to be displayed as input values are stored in the ROM or other storage units in advance.

Alternatively, suppose the key press detection unit 12 detects that the software key T7 is pressed while the display control unit 11 displays the operation screen W2 (FIG. 4B) on the LCD 74. In this case, the instruction acceptance unit 14 accepts an instruction for decreasing the input value of the number of copies displayed in the text box B1 in accordance with the duration of the time that the software key T7 is pressed. Upon receiving the instruction, the instruction acceptance unit 14 decrements the input value of the copy number displayed in the text box B1, for example, by one per second while the software key T7 is being pressed, and then causes the display control unit 11 to display an image of the decremented input value. In short, the text box B1 shows an image of an input value decremented by one every one second after a user presses the software key T7.

Suppose the key press detection unit 12 detects that the software key T4 is pressed while the display control unit 11 displays the operation screen W2 (FIG. 4B) on the LCD 74. In this case, the instruction acceptance unit 14 accepts an instruction for confirming the input value displayed in the text box B1 as the number of copies. Upon accepting the instruction, the instruction acceptance unit 14 stores the input number displayed in the text box B1 as the number of copies in the RAM. The control unit 10 uses the number of copies stored in the RAM to control execution of the copy function.

Alternatively, suppose the key press detection unit 12 detects that the software key T5 is pressed while the display control unit 11 displays the operation screen W2 (FIG. 4B) on the LCD 74. In this case, the instruction acceptance unit 14 accepts an instruction for changing the operation screen W2 to the previous operation screen. Upon accepting the instruction, the instruction acceptance unit 14 causes the display control unit 11 to display the operation screen, which was displayed previous to the operation screen W2, without changing the number of copies to the input value displayed in the text box B1, in other words, without changing the number of copies stored in the RAM.

The alarm unit 15 starts supplying an electrical signal to a speaker 76, with use of adjustment information stored in an adjustment information storage unit 17, which will be described later, in response to a press on a software key detected by the key press detection unit 12. Thus, the alarm unit 15 allows the speaker 76 to start outputting an alarm sound. The alarm unit 15 uses adjustment information to adjust the level of the electrical signal to be supplied to the speaker 76 based on the type of software key detected as being pressed and the key press duration detected by the key press duration detection unit 13 when a press on the software key has been detected. Thus, the alarm unit 15 adjusts the volume of the alarm sound to be output from the speaker 76.

The vibration drive unit 16 starts supplying an electrical signal to the vibration elements 75, with the use of adjustment information stored in the adjustment information storage unit 17, which will be described later, in response to a press on the software key detected by the key press detection unit 12. Thus, the vibration drive unit 16 starts applying vibration to the vibration elements 75 to vibrate the LCD 74. In addition, the vibration drive unit 16 uses adjustment information to adjust the level of the electrical signal to be supplied to the vibration elements 75 based on the type of the software key detected as being pressed and the key press duration detected by the key press duration detection unit 13 when a press on the software key has been detected. Thus, the vibration drive unit 16 adjusts the amplitude of vibration to be applied by the vibration elements 75 to the LCD 74.

The adjustment information storage unit 17 is, for example, a storage area in the RAM. The adjustment information storage unit 17 stores adjustment information. Let the adjustment information denote information about the relationship between key press duration, which is detected by the key press duration detection unit 13 when the respective software keys are detected as being pressed, and the volume of the alarm sound output by the alarm unit 15 from the speaker 76 and the amplitude of vibration applied by the vibration elements 75 driven by the vibration drive unit 16 to the LCD 74. The adjustment information is stored in the ROM or other storage units in advance. For example, the adjustment information is read out from the ROM during the initialization process run by the control unit 10 at the time of power-on of the multifunction peripheral 1, and then is stored in the adjustment information storage unit 17.

Figure 5:
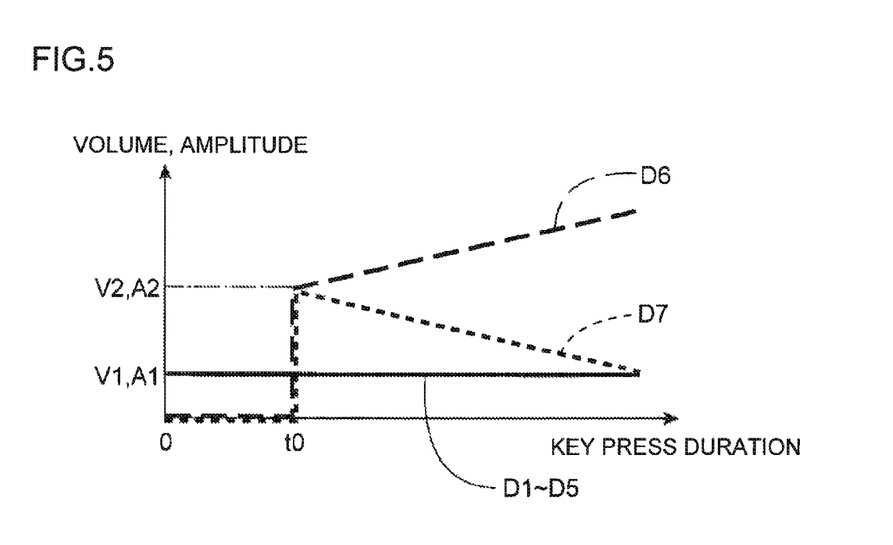
FIG. 5 is an explanatory diagram showing an example of adjustment information stored in an adjustment information storage unit.

FIG. 5 is an explanatory diagram showing an example of the adjustment information stored in the adjustment information storage unit 17. In this example, as indicated by a solid line in FIG. 5, the adjustment information storage unit 17 contains adjustment information items D1 to D5 each indicating a relationship between key press duration detected when each of the software keys T1 to T5 is detected as being pressed and the volume of the alarm sound and the amplitude of vibration.

The adjustment information items D1 to D5 represent that when a press on the software keys T1 to T5 is detected, the speaker 76 outputs an alarm sound at a predetermined volume V1 and the vibration elements 75 apply vibration of a predetermined amplitude A1 to the LCD 74 after the detected key press duration exceeds 0, that is, immediately after the detection of the press. The adjustment information items D1 to D5 also represent that the volume of the alarm sound and the amplitude of the vibration are maintained constant irrespective of the key press duration detected when the software keys T1 to T5 are detected as being pressed.

Therefore, when a press on the software keys T1 to T5 is detected, as indicated by the adjustment information items D1 to D5, the alarm unit 15 causes the speaker 76 to start outputting an alarm sound immediately after the detection of the key press and maintains the speaker 76 to output the alarm sound at a constant volume V1 until the press on the key is unable to be detected. Once a press on the software keys T1 to T5 is detected, the vibration drive unit 16 also immediately causes the vibration elements 75 to start applying vibration to the LCD 74 by using the adjustment information items D1 to D5 stored in the adjustment information storage unit 17, and keeps the vibration elements 75 applying vibration of amplitude A1 constantly to the LCD 74 until the press on the software keys is unable to be detected.

As indicated by a dashed line in FIG. 5, the adjustment information storage unit 17 stores an adjustment information item D6 representing the relationship between key press duration, which is detected by the key press duration detection unit 13 when a press on the software key T6 is detected, and the volume of the alarm sound and the amplitude of vibration.

The adjustment information item D6 also represents that the alarm sound volume and the vibration amplitude are set to be 0 while the detected key press duration is shorter than preset reference time t0 since the press on the software key T6 has been detected. In addition, the adjustment information item D6 represents that when the key press duration reaches the reference time t0 since the press on the software key T6 has been detected, the speaker 76 outputs an alarm sound at a predetermined volume V2 and the vibration elements 75 apply vibration of a predetermined amplitude A2 to the LCD 74. Furthermore, the adjustment information item D6 represents that once the key press duration exceeds the reference time t0 since the press on the software key T6 has been detected, the volume of the alarm sound output from the speaker 76 and the amplitude of the vibration applied by the vibration elements 75 to the LCD 74 are increased with an increase in the key press duration.

Thus, when a press on the software key T6 is detected, as indicated by the adjustment information item D6, the alarm unit 15 does not allow the speaker 76 to output an alarm sound while the key press duration is shorter than the reference time t0, and allows the speaker 76 to start outputting an alarm sound at a volume V2 when the key press duration reaches the reference time t0. After that, the alarm unit 15 increases the volume of the alarm sound to be output from the speaker 76 as the key press duration becomes longer until the press on the software key T6 is unable to be detected.

In addition, when a press on the software key T6 is detected, as indicated by the adjustment information item D6, the vibration drive unit 16 does not allow the vibration elements 75 to apply vibration to the LCD 74 while the key press duration is shorter than the reference time t0, and allows the vibration elements 75 to start applying vibration with an amplitude A2 to the LCD 74 when the key press duration reaches the reference time t0. After that, the vibration drive unit 16 increases the amplitude of the vibration to be applied by the vibration elements 75 to the LCD 74 as the press duration time becomes longer until the press on the key press T6 is unable to be detected.

As indicated by a dotted line in FIG. 5, the adjustment information storage unit 17 stores an adjustment information item D7 representing the relationship between key press duration, which is detected by the key press duration detection unit 13 when a press on the software key T7 is detected, and the volume of the alarm sound and the amplitude of vibration.

The adjustment information item D7 also represents that the alarm sound volume and the vibration amplitude are set to be 0 while the key press duration detected by the key press duration detection unit 13 is shorter than the reference time t0. In addition, the adjustment information item D7 represents that when the key press duration reaches the reference time t0 since the press on the software key T7 has been detected, the speaker 76 outputs an alarm sound at a predetermined volume V2 and the vibration elements 75 apply vibration of a predetermined amplitude A2 to the LCD 74. Furthermore, the adjustment information item D7 represents that once the detected key press duration exceeds the reference time t0 since the press on the software key T7 has been detected, the volume of the alarm sound output from the speaker 76 and the amplitude of the vibration applied by the vibration elements 75 to the LCD 74 are decreased with an increase in the key press duration.

Thus, when a press on the software key T7 is detected, as indicated by the adjustment information item D7, the alarm unit 15 does not allow the speaker 76 to output an alarm sound when the key press duration is shorter than the reference time t0, while allowing the speaker 76 to start outputting an alarm sound at a volume V2 when the key press duration reaches the reference time t0. After that, the alarm unit 15 decreases the volume of the alarm sound to be output from the speaker 76 as the press duration time becomes longer until the press on the software key T7 is unable to be detected.

In addition, when a press on the software key T7 is detected, as indicated by the adjustment information item D7, the vibration drive unit 16 does not allow the vibration elements 75 to apply vibration to the LCD 74 when the key press duration is shorter than the reference time t0, while allowing the vibration elements 75 to start applying vibration of an amplitude A2 to the LCD 74 when the key press duration reaches the reference time t0. After that, the vibration drive unit 16 decreases the amplitude of the vibration to be applied by the vibration elements 75 to the LCD 74 as the key press duration becomes longer until the press on the software key T7 is unable to be detected.

The reference time t0 can be any values from 0 or higher. In the case where the reference time t0 is set to 0, upon detection of the software key T6 (T7) as being pressed, the alarm unit 15 causes the speaker 76 to start outputting an alarm sound immediately after the key press detection. After that, the alarm unit 15 increases (decreases) the volume of the alarm sound to be output from the speaker 76 as the key press duration becomes longer until the press on the software key T6 (T7) is unable to be detected.

Similarly, in the case where the reference time t0 is set to 0, upon detection of the press on the software key T6 (T7), the vibration drive unit 16 causes the vibration elements 75 to apply vibration to the LCD 74 immediately after the key press detection. After that, the alarm unit 15 increases (decreases) the amplitude of the vibration to be applied by the vibration elements 75 to the LCD 74 as the key press duration becomes longer until the press on the software key T6 (T7) is unable to be detected.

According to the above-described embodiment, when a user presses a software key to input an operating instruction, the alarm sound starts playing and the LCD 74 vibrates in response to the detection of the key press. Therefore, the user can readily recognize which software key has been pressed or which operating instruction has been input without seeing the displayed contents that have been changed by switching the operation screen in response to the entry of the operating instruction indicated by the software key.

In addition, the volume of the alarm sound and the amplitude of the vibration applied to the LCD 74 are adjusted based on the type of the pressed software key and the key press duration. If the software key pressed by the user is the software key T6 or T7, which is used to input an operating instruction for changing the input value in accordance with the key press duration, the user can readily recognize the amount in change of the input value obtained by inputting the operating instruction based on the volume of the alarm sound and the amplitude degree of the vibration of the LCD 74.

According to the configuration of this embodiment, the user can readily recognize the key press duration based on the change in volume of the alarm sound while continuing to press the software key T6 or T7 to input the operating instruction for changing the input value in accordance with the key press duration. Recognizing the key press duration can make the user readily understand the degree to which the input value has been changed.

According to the configuration of this embodiment, the user can readily recognize the key press duration based on the change in vibration degree of the LCD 74 while continuing to press the software key T6 or T7 to input the operating instruction for changing the input value in accordance with the key press duration. Recognizing the key press duration can make the user readily understand the degree to which the input value has been changed.

Note that the configuration and the other features according to the first embodiment shown in FIGS. 1 to 5 are merely examples and are not meant to limit the present disclosure to the first embodiment. Another embodiment different from the first embodiment will be described below.

Second Embodiment

The second embodiment is characterized in that the control unit 10 further functions as a frequency storage unit 18 and a frequency update unit 19 as enclosed by a dashed line in FIG. 2. Like components in the second embodiment are denoted by like numerals as of the first embodiment and will not be further explained.

The frequency storage unit 18 is, for example, a storage area in the RAM. The frequency storage unit 18 stores the frequency with which the key press detection unit 12 detects each of the software keys as being pressed. The frequency is associated with each software key and is stored by the frequency update unit 19, which will be described later. When the key press detection unit 12 detects that a software key is pressed, the frequency update unit 19 updates the frequency of the detected press on the software key, which is stored in the frequency storage unit 18.

It is assumed in one example that the higher the cumulative number of times a press on a software key has been detected, the higher the frequency of detecting a press on the software key. In other words, it can be defined that the cumulative number of times the software key has been detected as being pressed denotes the frequency of the detected press on the software key. Therefore, when the key press detection unit 12 detects that a software key has been pressed, the frequency update unit 19 associates the cumulative number of times the software key has been detected as being pressed with the software key to store the cumulative number in the frequency storage unit 18.

Figure 6:
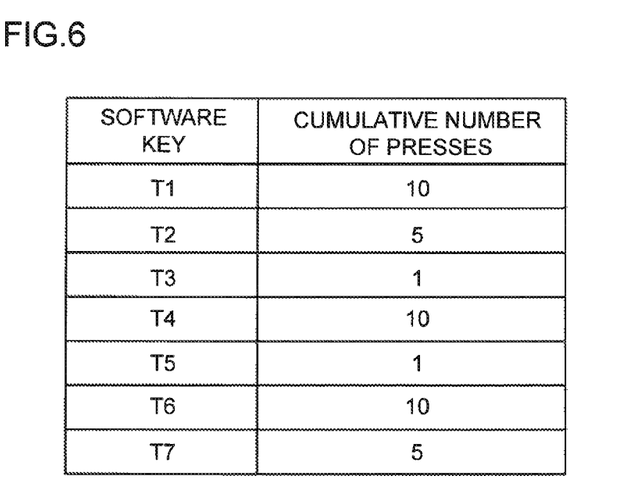
FIG. 6 is an explanatory diagram showing an example of the frequency with which respective software keys are detected as being pressed.

FIG. 6 is an explanatory diagram showing an example of the frequency with which the respective software keys have been detected as being pressed. The example in FIG. 6 shows that if the press on the software keys T1, T4, T6 has been detected 10 times, the frequency update unit 19 updates the cumulative numbers of the detected presses on the software keys T1, T4, T6, which are stored in the frequency storage unit 18, to "10".

Also, if the press on the software keys T2, T7 has been detected 5 times, the frequency update unit 19 updates the cumulative numbers of the detected presses on the software keys T2, T7, which are stored in the frequency storage unit 18, to "5".

Also, if the press on the software keys T3, T5 has been detected 1 time, the frequency update unit 19 updates the cumulative numbers of the detected presses on the software keys T3, T5, which are stored in the frequency storage unit 18, to "1".

Under this circumstance, if the key press detection unit 12 detects that the software key T1 has been pressed, the frequency update unit 19 retrieves the cumulative number "10" that is associated with the software key T1 and is stored in the frequency storage unit 18, and adds 1 to "10". This brings the cumulative total to "11", and thus the frequency update unit 19 updates the cumulative number associated with the software key T1 in the frequency storage unit 18.

The frequency update unit 19 stores the information stored in the frequency storage unit 18 into the ROM when the multifunction peripheral 1 is shut down. At the initial operation of the multifunction peripheral 1, the frequency update unit 19 reads out the information that was stored in the ROM at the time of shutdown and stores the information in the frequency storage unit 18. However, the frequency update unit 19 can be configured so as not to store the information from the frequency storage unit 18 into the ROM when the multifunction peripheral 1 is shut down. In other words, the information stored in the frequency storage unit 18 can be deleted when the multifunction peripheral 1 is shut down. Alternatively, the frequency update unit 19 can be configured to delete the information in the frequency storage unit 18 at a predetermined point of time, for example, at noon.

In addition, the frequency storage unit 18 can be a nonvolatile memory, such as an EEPROM. These configurations can eliminate the processes of reading out the information for the frequency storage unit 18 from the ROM and storing the information in the ROM, thereby simplifying the processes performed by the frequency update unit 19.

Accordingly, in the second embodiment, the alarm unit 15 outputs an alarm sound at a higher volume when the cumulative number (frequency) stored in the frequency storage unit 18 is the first cumulative number (third frequency) than when the cumulative number stored in the frequency storage unit 18 is the second cumulative number (fourth frequency), which is lower than the first cumulative number.

In addition, in the second embodiment, the vibration drive unit 16 applies vibration with greater amplitude to the LCD 74 when the cumulative number (frequency) stored in the frequency storage unit 18 is the third cumulative number (first frequency) than when the cumulative number stored in the frequency storage unit 18 is the fourth cumulative number (second frequency), which is lower than the third cumulative number.

Figure 7:
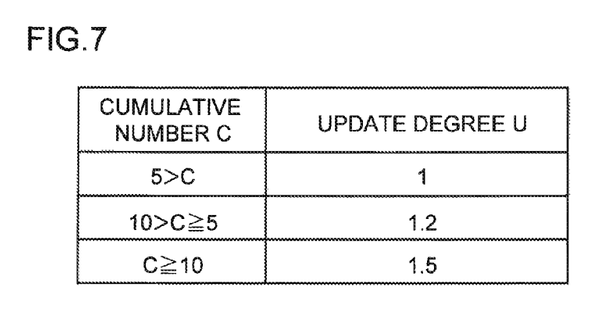
FIG. 7 is an explanatory diagram showing an example of the relationship between cumulative numbers stored in a frequency storage unit and update degrees of alarm sound volume and vibration amplitude.

FIG. 7 is an explanatory diagram showing an example of the relationship between cumulative numbers stored in the frequency storage unit 18 and update degrees of the alarm sound volume and vibration amplitude. Specifically, as shown in FIG. 7, the ROM or other storage units stores in advance information for associating cumulative numbers C stored in the frequency storage unit 18 with degrees U in which the alarm unit 15 and vibration drive unit 16 update the alarm sound volume and vibration amplitude, respectively, (hereinafter referred to as update degrees U).

In FIG. 7, two predetermined reference numbers "5" and "10" are used to group the cumulative numbers C into three ranges: a range below the reference number "5"; a range from the reference number "5" to less than the reference number "10"; and a range from the reference number "10". The cumulative numbers C in the range below the reference number "5" are associated with an update degree U of "1.0". The cumulative numbers C in the range from the reference number "5" to less than the reference number "10" are associated with an update degree U of "1.2". The cumulative numbers C in the range from the reference number "10" are associated with an update degree U of "1.5". As described above, the update degrees U associated with the cumulative numbers C are set to be higher with an increase in the cumulative number C.

For example, the frequency storage unit 18 stores the cumulative numbers of times the respective software keys T1 to T7 have been detected as being pressed as shown in FIG. 6, while the ROM or other storage units store information used to associate the cumulative numbers C stored in the frequency storage unit 18 with the update degrees U as shown in FIG. 7.

Figure 8A:
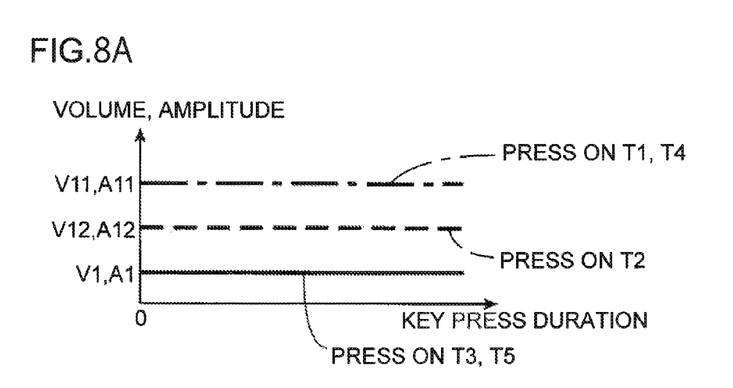
FIG. 8A is an explanatory diagram showing an example of the alarm sound volume and vibration amplitude after being adjusted in accordance with the frequency of the detected presses on the respective software keys.

Suppose that the key press detection unit 12 detects that the software key T1 or T4 has been pressed. In this case, the cumulative number of times the press on the software key T1 or T4 has been detected is "10" (first frequency, third frequency), and the cumulative number "10" is associated with the update degree U of "1.5". FIG. 8A is an explanatory diagram showing an example of alarm sound volume and vibration amplitude after being adjusted in accordance with the frequency of the detected presses on the software keys T1 to T5.

As shown in FIG. 8A, the alarm unit 15 adjusts the volume V1 of the alarm sound (FIG. 5) to be output from the speaker 76 by using the update degree U of "1.5", resulting in a "1.5-times" volume V11. Similarly, the vibration drive unit 16 adjusts the amplitude A1 (FIG. 5) of the vibration applied by the vibration elements 75 to the LCD 74 by using the update degree U of "1.5", resulting in a "1.5-times" amplitude A11.

Suppose that the key press detection unit 12 detects that the software key T2 has been pressed. In this case, the cumulative number of times the press on the software key T2 has been detected is "5" (second frequency, fourth frequency), and the cumulative number "5" is associated with the update degree U of "1.2". As shown in FIG. 8A, the alarm unit 15 adjusts the volume V1 of the alarm sound (FIG. 5) by using the update degree U of "1.2", resulting in a "1.2-times" volume V12. Similarly, the vibration drive unit 16 adjusts the amplitude A1 of the vibration by using the update degree U of "1.2", resulting in a "1.2-times" amplitude A12.

Suppose that the key press detection unit 12 detects that the software key T3 or T5 has been pressed. In this case, the cumulative number of times the press on the software key T3 or T5 has been detected is "1", and the cumulative number "1" is associated with the update degree U of "1". As shown in FIG. 8A, the alarm unit 15 adjusts the volume V1 of the alarm sound (FIG. 5) by using the update degree U of "1.0", resulting in a "1.0-time" volume V1. In other words, the alarm unit 15 does not update the volume V1. Similarly, the vibration drive unit 16 adjusts the amplitude A1 of vibration by using the update degree U of "1.0", resulting in a "1.0-time" amplitude A1. In other words, the vibration drive unit 16 does not update the amplitude A1.

Figure 8B:
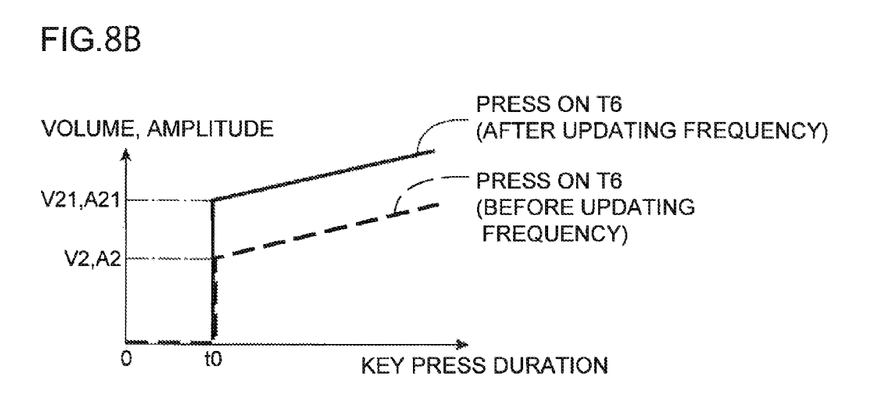
FIG. 8B is an explanatory diagram showing an example of the alarm sound volume and vibration amplitude after being adjusted in accordance with the frequency of the detected presses on the respective software keys.

Suppose that the key press detection unit 12 detects that the software key T6 has been pressed. In this case, the cumulative number of times the press on the software key T6 has been detected is "10", and the cumulative number "10" is associated with the update degree U of "1.5". FIG. 8B is an explanatory diagram showing an example of the alarm sound volume and vibration amplitude after being adjusted in accordance with the frequency of the detected press on the software key T6.

As shown in FIG. 8B, the alarm unit 15 adjusts the volume V2 of the alarm sound (FIG. 5) at the start of output when the key press duration reaches the reference time t0, by using the update degree U of "1.5", resulting in a "1.5-times" volume V21. Then, the alarm unit 15 increases the volume of the alarm sound output from the speaker 76 with an increase in the key press duration at the same increasing rate as that indicated by the adjustment information item D6 (FIG. 5) during a period from the time the key press duration exceeds the reference time t0 to the time the press on the software key T6 is unable to be detected.

Similarly, the vibration drive unit 16 adjusts the amplitude A2 (FIG. 5) of the vibration applied by the vibration elements 75 to the LCD 74 at the start of application when the key press duration reaches the reference time t0, by using the update degree U of "1.5", resulting in a "1.5-times" amplitude A21. Then, the vibration drive unit 16 increases the amplitude of the vibration applied from the vibration elements 75 to the LCD 74 with an increase in the key press duration at the same increasing rate as that indicated by the adjustment information item D6 (FIG. 5) during a period from the time the key press duration exceeds the reference time t0 to the time the press on the software key T6 is unable to be detected.

Figure 8C:
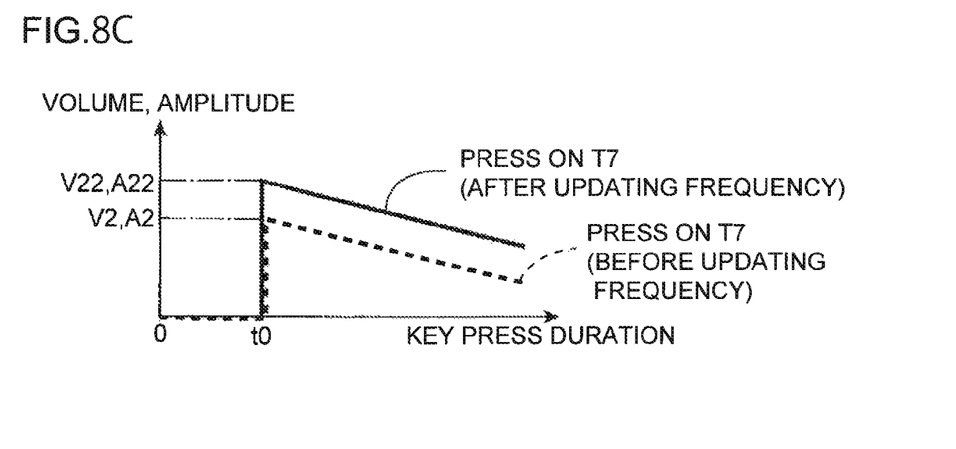
FIG. 8C is an explanatory diagram showing an example of the alarm sound volume and vibration amplitude after being adjusted in accordance with the frequency of the detected presses on the respective software keys.

Suppose that the key press detection unit 12 detects that the software key T7 has been pressed. In this case, the cumulative number of times the press on the software key T7 has been detected is "5", and the cumulative number "5" is associated with the update degree U of "1.2". FIG. 8C is an explanatory diagram showing an example of the alarm sound volume and vibration amplitude after being adjusted in accordance with the frequency of the detected press on the software key T7.

As shown in FIG. 8C, the alarm unit 15 adjusts the volume V2 of the alarm sound (FIG. 5) at the start of output when the key press duration reaches the reference time t0, by using the update degree U of "1.2", resulting in a "1.2-times" volume V22. Then, the alarm unit 15 decreases the volume of the alarm sound output from the speaker 76 with an increase in the key press duration at the same decreasing rate as that indicated by the adjustment information item D7 (FIG. 5) during a period from the time the key press duration exceeds the reference time t0 to the time the press on the software key T7 is unable to be detected.

Similarly, the vibration drive unit 16 adjusts the amplitude A2 (FIG. 5) of the vibration applied to the LCD 74 at the start of application when the key press duration reaches the reference time t0, by using the update degree U of "1.2", resulting in a "1.2-times" amplitude A22. Then, the vibration drive unit 16 decreases the amplitude of the vibration applied from the vibration elements 75 to the LCD 74 with an increase in the key press duration at the same decreasing rate as that indicated by the adjustment information item D7 (FIG. 5) during a period from the time the key press duration exceeds the reference time t0 to the time the press on the software key T7 is unable to be detected.

According to the second embodiment, the volumes V11, V21 of the alarm sounds, which are output when the cumulative numbers C of the detected presses on the software keys are the first cumulative number of "10", are higher than the volumes V12, V22 of the alarm sounds, which are output when the cumulative numbers C are the second cumulative number of "5", which is lower than the first cumulative number of "10". In short, the higher the frequency with which the software keys are pressed, the higher the volume of the alarm sound. Therefore, the user can readily recognize that he/she has input an operating instruction with a high input frequency.

In addition, the amplitudes A11, A21 of the vibrations, which are applied to the LCD 74 when the cumulative numbers C of the detected presses on the software keys are the third cumulative number of "10", are greater than the amplitudes A12, A22 of the vibrations, which are applied to the LCD 74 when the cumulative numbers C are the fourth cumulative number of "5", which is lower than the third cumulative number of "10". In short, the higher the frequency with which the software keys are pressed, the greater the amplitude of the vibration applied to the LCD 74. Therefore, the user can readily recognize that he/she has input an operating instruction with a high input frequency.

Although the information about the relationship between the cumulative numbers C and the update degrees U stored in the ROM or other storage units in the second embodiment includes the grouped cumulative numbers C of the detected presses on the software keys (grouped into three ranges in FIG. 7) and the update degrees U that are associated with the respective ranges of the cumulative numbers as shown in FIG. 7, the information is not limited thereto.

Figure 9:
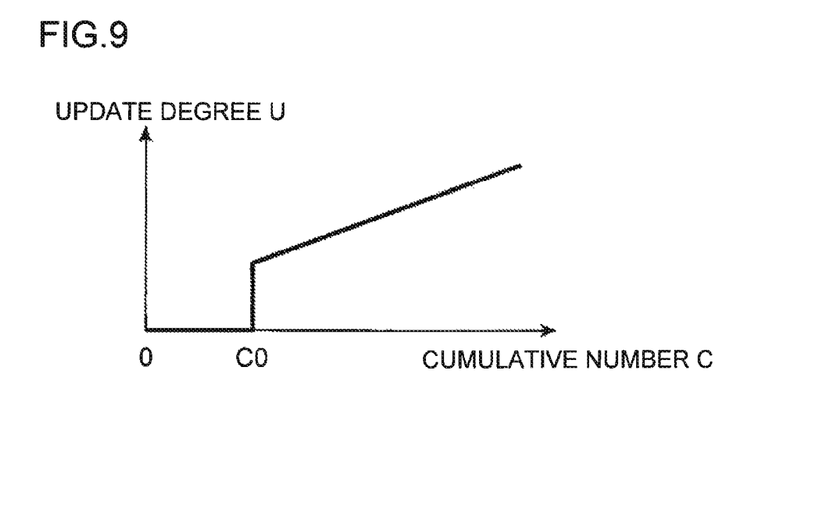
FIG. 9 is an explanatory diagram showing another example of the relationship between cumulative numbers stored in the frequency storage unit and update degrees of the alarm sound volume and vibration amplitude, the example being different from that shown in FIG. 7.

FIG. 9 is an explanatory diagram showing another example of the relationship between cumulative numbers stored in the frequency storage unit 18 and update degrees U of the alarm sound volume and vibration amplitude. This example is different from that shown in FIG. 7. For example, the information indicating the relationship between the cumulative numbers C and update degrees U stored in the ROM or other storage units can be set, as shown in FIG. 9, so that once the cumulative number C reaches a predetermined reference cumulative number C0 or higher, the update degree U continuously varies in association with the cumulative number C, more specifically the update degree U increases with an increase of the cumulative number C. The reference cumulative number C0 can be any values from 0 or higher.

The adjustment information items D1 to D7 stored in the adjustment information storage unit 17 are not limited to the example shown in FIG. 5. For example, the adjustment information item D6 (D7) shown in FIG. 5 represents that once the key press duration reaches or exceeds the reference time t0, the volume of the alarm sound output from the speaker 76 and the amplitude of the vibration applied by the vibration elements 75 to the LCD 74 increase (decrease) in a continuous manner with an increase in the key press duration. However, the adjustment information item D6 (D7) can be set to indicate that once the key press duration reaches or exceeds the reference time t0, the volume of the alarm sound output from the speaker 76 and the amplitude of the vibration applied by the vibration elements 75 to the LCD 74 increase (decrease) in a stepwise manner with an increase in the key press duration.

Figure 10:
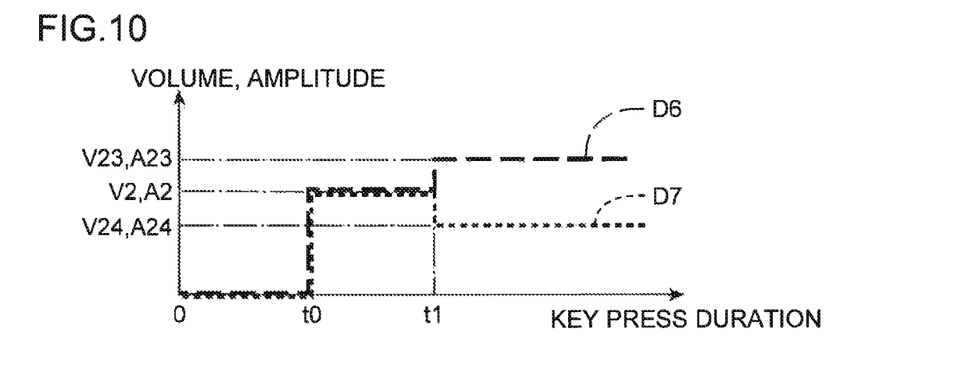
FIG. 10 is an explanatory diagram showing another example of the adjustment information stored in the adjustment information storage unit, the example being different from that shown in FIG. 5.

FIG. 10 is an explanatory diagram showing another example of the adjustment information items D6 and D7 stored in the adjustment information storage unit 17. This example is different from that shown in FIG. 5. Specifically, as shown in FIG. 10, the adjustment information item D6 (D7) can be set to indicate that when the key press duration is equal to or longer than the reference time t0 but shorter than a predetermined second reference time t1, which is preset longer than the reference time t0, the volume of the alarm sound is changed to a predetermined volume V2 (FIG. 5) and the amplitude of the vibration is changed to an amplitude A2 (FIG. 5). In addition, the adjustment information item D6 (D7) can be set to indicate that when the key press duration exceeds the second reference time t1, the volume of the alarm sound is changed to a volume V23 (V24), which is higher (lower) than the predetermined volume V2, and the amplitude of the vibration is changed to an amplitude A23 (A24), which is greater (smaller) than the amplitude A2 (FIG. 5).

Furthermore, the adjustment information item D7 can be set to indicate that when the key press duration is equal to or longer than the reference time t0, the volume of the alarm sound output from the speaker 76 and the amplitude of the vibration applied by the vibration elements 75 to the LCD 74 increase with an increase in the key press duration, as with the case of the adjustment information item D6.

In this case, as indicated by the adjustment information D7, once the software key T7 is detected as being pressed, the alarm unit 15 increases the volume of the alarm sound to be output from the speaker 76 with an increase in the key press duration during a period from the time the key press duration reaches the reference time t0 to the time the press on the software key T7 is unable to be detected. Also, the vibration drive unit 16 increases the amplitude of the vibration to be applied by the vibration elements 75 to the LCD 74 with an increase in the key press duration during a period from the time the key press duration reaches the reference time t0 to the time the press on the software key T7 is unable to be detected.

The above-described embodiments can dispense with the speaker 76 and alarm unit 15 for simplification. In addition, the above-described embodiments can dispense with the vibration elements 75 and vibration drive unit 16 for simplification.

The display control device 100 according to the present disclosure is not limited to the one mounted in the multifunction peripheral 1 and is applicable to various types of electronic apparatuses, for example, image forming apparatuses, such as copiers, printers and facsimiles, scanners, personal computers, cell phones, microwaves, washing machines, car navigation systems, and video game machines.

What is claimed is:

1. A display control device for a device configured to produce copies comprising:
a display unit that displays one or a plurality of instruction images to be pressed to input operating instructions;
a key press detection unit that detects a press on the instruction image;
a key press duration detection unit that detects a duration of the time the key press detection unit continuously detects that the instruction image is being pressed; and
a vibration drive unit that starts applying vibration to the display unit in response to the press on the instruction image detected by the key press detection unit and adjusts the amplitude of the vibration based on the type of the instruction image detected as being pressed and the key press duration; wherein
the vibration drive unit includes a first instruction image that is pressed to provide an instruction for increasing an input value of a number of said copies in accordance with the duration of time the instruction image is being pressed and, when the press is detected, increases an amplitude of the vibration to be applied by the vibration drive unit to the display unit when the duration of time becomes longer and a second instruction image that is pressed to provide an instruction for decreasing the input value of the number of copies in accordance with the duration of time the instruction image is being pressed and, when the press is detected, decreases the amplitude of the vibration to be applied by the vibration drive unit to the display unit when the duration of time becomes longer.

2. The display control device according to claim 1, further comprising:
a frequency storage unit that stores a frequency with which the key press detection unit detects the press on the instruction image; and
a frequency update unit that updates the frequency of the instruction image stored in the frequency storage unit when the key press detection unit detects the press on the instruction image, wherein
the vibration drive unit changes the amplitude of the vibration in accordance with the frequency stored in the frequency storage unit.

3. The display control device according to claim 2, wherein
the vibration drive unit applies vibration with greater amplitude to the display unit when the frequency stored in the frequency storage unit is a first frequency than when the frequency stored in the frequency storage unit is a second frequency, which is lower than the first frequency.

4. The display control device according to claim 1, further comprising:
an alarm unit that starts outputting an alarm sound in response to the press on the instruction image detected by the key press detection unit and adjusts the volume of the alarm sound based on the type of the instruction image detected as being pressed and the key press duration.

5. A display control device for a device configured to produce copies comprising:
a display unit that displays one or a plurality of instruction images to be pressed to input operating instructions;
a key press detection unit that detects a press on the instruction image;
a key press duration detection unit that detects a duration of the time the key press detection unit continuously detects that the instruction image is being pressed; and
an alarm unit that starts outputting an alarm sound in response to the press on the instruction image detected by the key press detection unit and adjusts the volume of the alarm sound based on the type of the instruction image detected as being pressed and the key press duration; wherein the alarm unit includes a first instruction image that is pressed to provide an instruction for increasing an input value of a number of copies in accordance with the duration of time the instruction image is being pressed and, when the press is detected, increases the volume of the alarm sound when the duration of time becomes longer and a second instruction image that is pressed to provide an instruction for decreasing the input value of the number of copies in accordance with the duration of time the instruction image is being pressed and, when the press is detected, decrease the volume of the alarm sound when the duration of time becomes longer.

6. The display control device according to claim 4, further comprising:

a frequency storage unit that stores the frequency with which the key press detection unit detects the press on the instruction image; and a frequency update unit that updates the frequency of the instruction image stored in the frequency storage unit when the key press detection unit detects the press on the instruction image; wherein the alarm unit adjusts the volume of the alarm sound in accordance with the frequency stored in the frequency storage unit.

7. The display control device according to claim 6, wherein the alarm unit outputs the alarm sound at a higher volume when the frequency stored in the frequency storage unit is a third frequency than when the frequency stored in the frequency storage unit is a fourth frequency, which is lower than the third frequency.

8. The display control device according to claim 1, wherein the display unit includes a liquid crystal panel and a backlight.

9. The display control device according to claim 4, wherein the alarm unit transmits an electrical signal to a speaker to output a beep tone.

10. An electronic apparatus comprising:

a display control device according to claim 1; and an instruction acceptance unit that accepts an operating instruction corresponding to an instruction image when the key press detection unit detects the press on the instruction image.

* * * * *